US008638977B2

(12) United States Patent
Bloom et al.

(10) Patent No.: US 8,638,977 B2
(45) Date of Patent: Jan. 28, 2014

(54) VOLUME MARKING WITH LOW-FREQUENCY

(75) Inventors: Jeffrey Adam Bloom, East Windsor, NJ (US); Jun Tian, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 277 days.

(21) Appl. No.: 12/452,384

(22) PCT Filed: Jun. 29, 2007

(86) PCT No.: PCT/US2007/015158
§ 371 (c)(1),
(2), (4) Date: Dec. 28, 2009

(87) PCT Pub. No.: WO2009/005494
PCT Pub. Date: Jan. 8, 2009

(65) Prior Publication Data
US 2010/0135523 A1 Jun. 3, 2010

(51) Int. Cl.
*G06K 9/00* (2006.01)
(52) U.S. Cl.
USPC ............ 382/100; 382/232; 382/240; 382/173
(58) Field of Classification Search
USPC ......... 382/100, 232, 240, 135–139, 162–167;
380/28, 54, 30, 51, 201, 210, 252, 287;
348/61, 461, 463; 358/3.28, 2.1, 452;
370/522–529; 283/72–81, 85, 93, 901,
283/902, 113; 713/176, 179; 345/3.28, 3.3;
375/130; 720/20, 22
See application file for complete search history.

(56) References Cited

U.S. PATENT DOCUMENTS

| | | | | |
|---|---|---|---|---|
| 5,943,448 | A | * | 8/1999 | Tatsuta .......................... 382/270 |
| 6,044,114 | A | * | 3/2000 | Ibenthal et al. ........... 375/240.16 |
| 6,219,460 | B1 | * | 4/2001 | Tatsuta .......................... 382/270 |
| 6,711,276 | B1 | | 3/2004 | Yoshiura et al. |
| 6,807,285 | B1 | * | 10/2004 | Iwamura ....................... 382/100 |
| 6,885,757 | B2 | | 4/2005 | Bloom et al. |
| 6,996,248 | B2 | | 2/2006 | Fudge et al. |
| 7,068,809 | B2 | * | 6/2006 | Stach ............................ 382/100 |
| 7,174,030 | B2 | * | 2/2007 | Sugahara et al. ............. 382/100 |
| 7,254,830 | B2 | | 8/2007 | Amonou et al. |

(Continued)

FOREIGN PATENT DOCUMENTS

| | | | | |
|---|---|---|---|---|
| EP | | 1006730 | 1/2000 | |
| JP | 2004258752 | A | * 9/2004 | ................ G06T 7/00 |

(Continued)

OTHER PUBLICATIONS

Bloom et al.: "Content-Dependent, Low-Frequency Watermarking for Motion Pictures," Sarnoff Corporation Workshop on Digital Rights Management Impact on Consumer Communications, Jan. 6, 2005, 21 pages.

(Continued)

*Primary Examiner* — Mekonen Bekele
(74) *Attorney, Agent, or Firm* — Robert D. Shedd; Jerome G. Schaefer

(57) ABSTRACT

A method and apparatus for embedding watermark data into a data stream using the insertion of low frequency carriers modulated by the watermark data into selected spatio-temporal volumes having equal total luminance values

7 Claims, 6 Drawing Sheets

Preprocessing Steps

(56) References Cited

U.S. PATENT DOCUMENTS

| | | | |
|---|---|---|---|
| 7,447,337 B2* | 11/2008 | Zhang et al. | 382/107 |
| 7,719,551 B2* | 5/2010 | Aoki et al. | 345/690 |
| 7,724,917 B2* | 5/2010 | Isogai | 382/100 |
| 7,920,715 B2* | 4/2011 | Hashimoto et al. | 382/100 |
| 8,090,141 B2 | 1/2012 | Eschbach | |
| 2002/0105839 A1* | 8/2002 | Sugahara et al. | 365/200 |
| 2003/0021439 A1 | 1/2003 | Lubin et al. | |
| 2003/0039376 A1 | 2/2003 | Stach | |
| 2003/0058477 A1* | 3/2003 | Brunk et al. | 358/3.28 |
| 2004/0001165 A1* | 1/2004 | Shiota et al. | 348/678 |
| 2004/0125952 A1* | 7/2004 | Alattar et al. | 380/202 |
| 2004/0250079 A1 | 12/2004 | Kalker et al. | |
| 2005/0025335 A1 | 2/2005 | Bloom et al. | |
| 2005/0025336 A1 | 2/2005 | Lubin et al. | |
| 2005/0105763 A1 | 5/2005 | Lee et al. | |
| 2007/0183626 A1* | 8/2007 | Hashimoto et al. | 382/100 |
| 2008/0056529 A1* | 3/2008 | Bhattacharjya | 382/100 |
| 2008/0095237 A1* | 4/2008 | Hussain et al. | 375/240.16 |
| 2010/0163629 A1* | 7/2010 | Rhoads et al. | 235/487 |

FOREIGN PATENT DOCUMENTS

| | | |
|---|---|---|
| JP | 2006054689 | 2/2006 |
| JP | 2006237742 | 9/2006 |
| JP | 2007208980 | 8/2007 |

OTHER PUBLICATIONS

Bloom et al.: "Watermarking to Track Motion Picture Theft," Sarnoff Corporation, Princeton, NJ, USA, IEEE, 2004.

Haitsma et al.: "A Watermarking Scheme for Digital Cinema," Philips Research, The Netherlands, IEEE, 2001, pp. 487-489.

Lubin et al.: "Robust, Content-Dependent, High-Fidelity Watermark for Tracking in Digital Cinema," in *Security and Watermarking of Multimedia Contents V*, presented at Electronic Imaging Symposium on Jan. 24, 2003 in Santa Clara, CA, Proceedings of SPIE vol. 5020 (2003), 11 pages.

Van Leest et al.: "On Digital Cinema and Watermarking," in *Security and Watermarking of Multimedia Contents V*, Proceedings of SPIE-IS&T Electronic Imaging, SPIE vol. 5020 (2003), pp. 526-535.

International Search Report, dated Jul. 16, 2008.

* cited by examiner

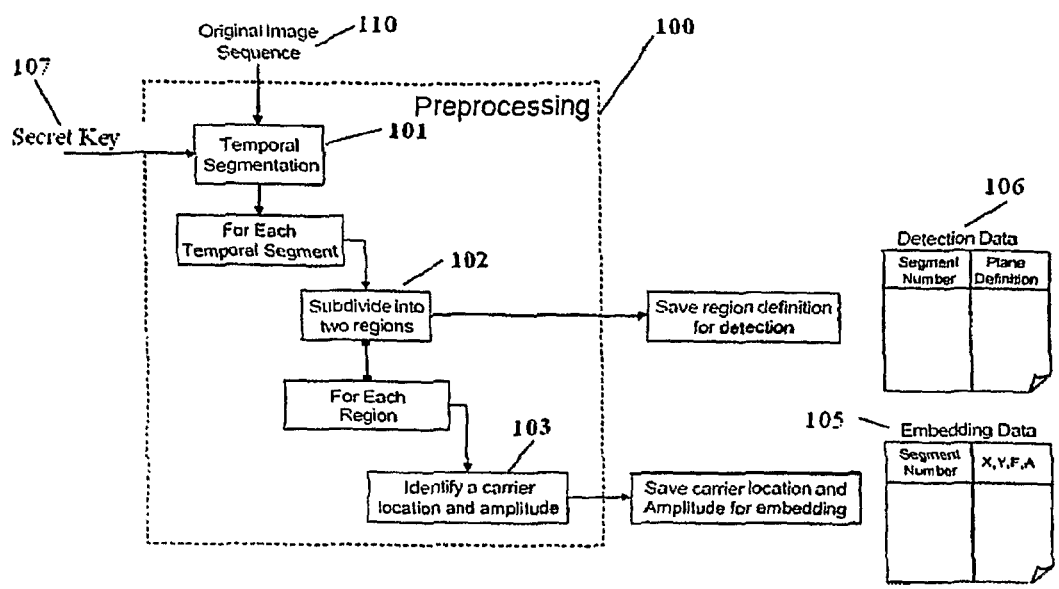
Figure 1. Preprocessing Steps

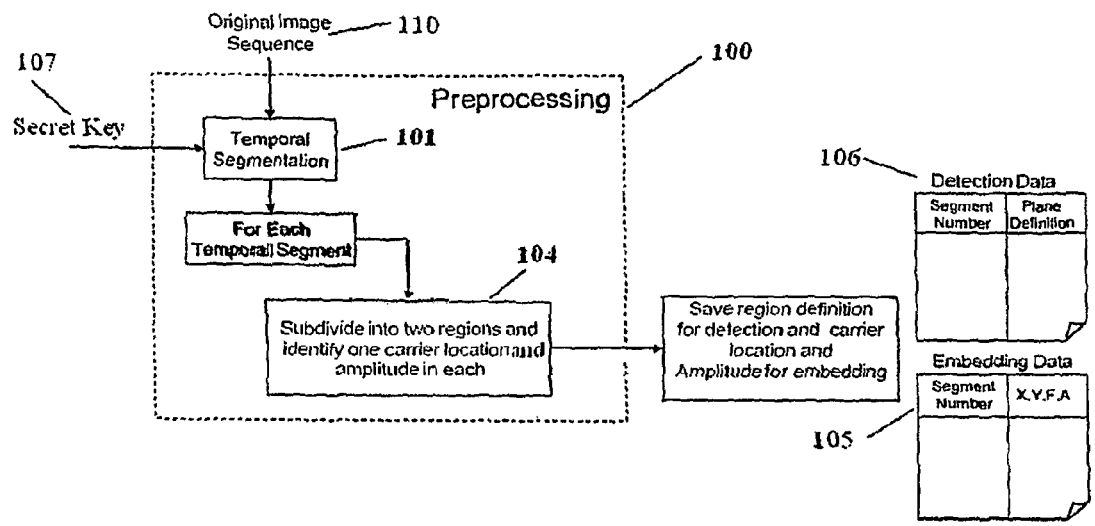
Figure 2. Alternative preprocessing approach in which subdivision and carrier placement are done simultaneously

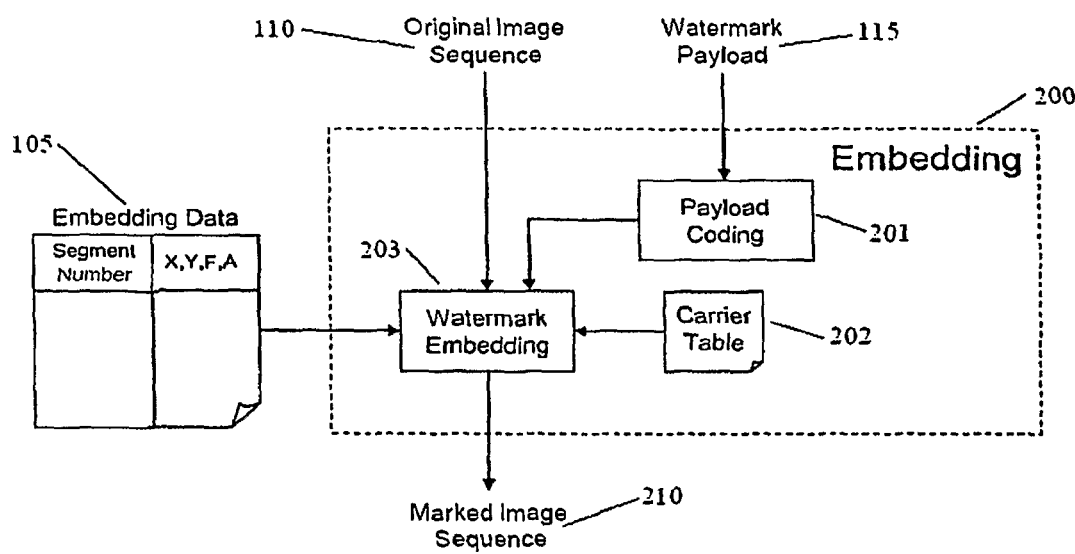
Figure 3. Embedding Inputs and Outputs.

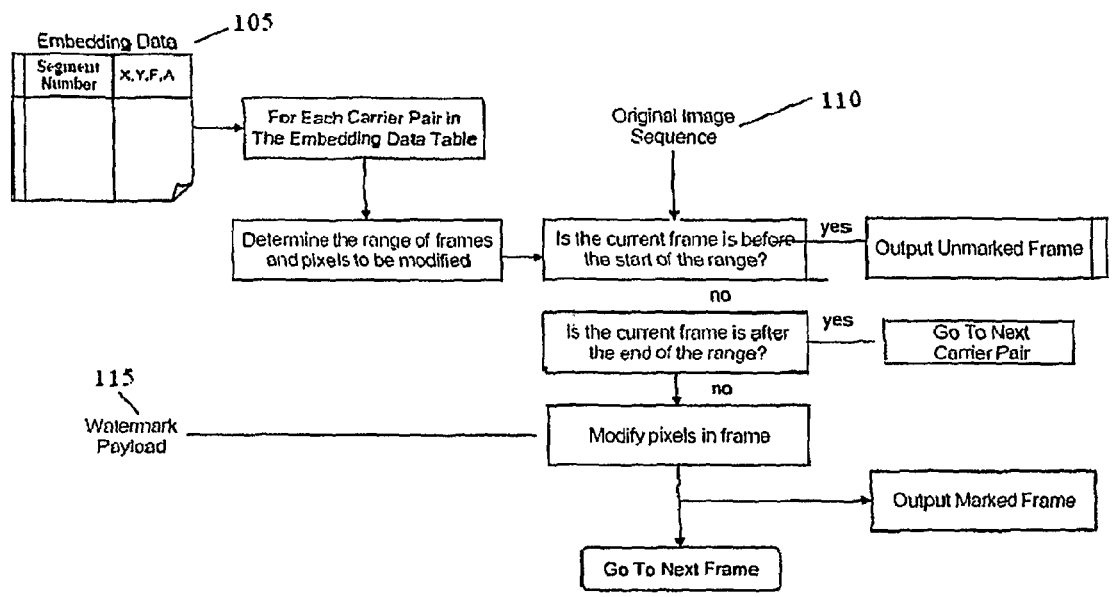
Figure 4. Practical Embodiment of the Embedding Process

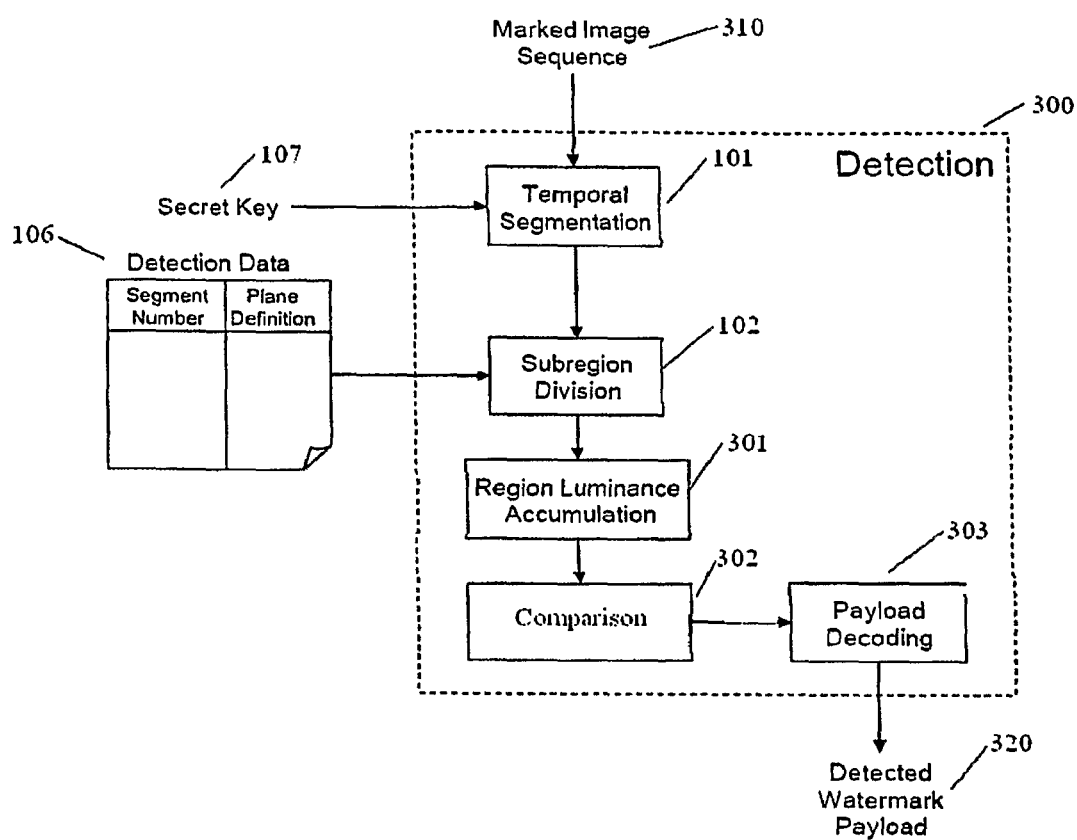
Figure 5. Detection Process

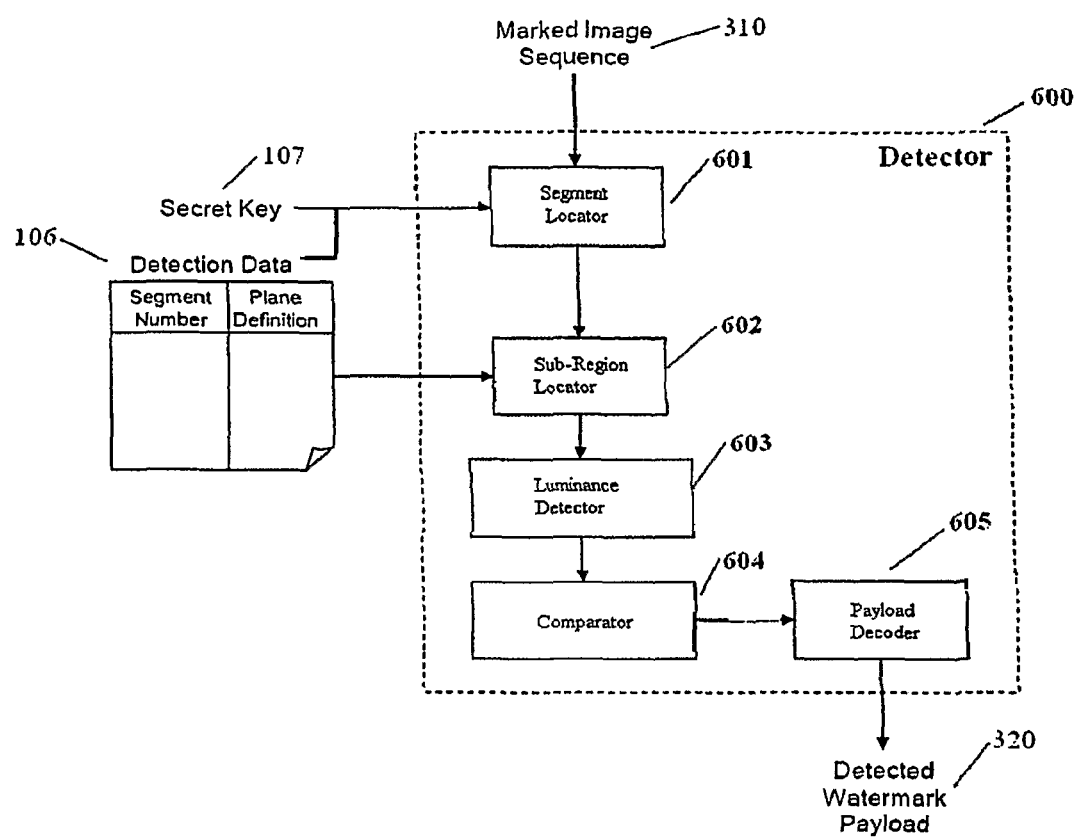
Figure 6. Watermark Detector

VOLUME MARKING WITH LOW-FREQUENCY

This application claims the benefit, under 35 U.S.C. § 365 of International Application PCT/US2007/015158, filed Jun. 29, 2007 which was published in accordance with PCT Article 21(2) on Jan. 8, 2009 in English.

TECHNICAL FIELD

The present invention relates generally to video processing, and relates more particularly to the insertion and recovery of watermark data into and from content.

BACKGROUND

Content, when prepared for presentation or actually presented to users, is susceptible to unauthorized capture, reproduction or storage. Display, sale or any unauthorized use of content deprives the rightful owner from receiving revenue from such usage. While encryption and other access limiting techniques provide protection against unauthorized use at different stages of content distribution or storage, the content itself is vulnerable during presentation to the user. Little can be done to prevent a determined effort to capture content that is being displayed.

One deterrent to unauthorized use of content is the insertion of information, a watermark, into the content itself such that it is essentially imperceptible to the user while still being detectable in the unauthorized copies by using tools to recover the inserted watermark. When the watermark is linked to the distribution channel, such as having a unique watermark for each distributor or exhibition location, the source of the unauthorized copy can be determined. To be successful, the inserted information must survive the capture/copying processes such that the information is still detectable in the unauthorized copies. Additionally this watermark information must not be inserted by unauthorized persons and must be secure from removal once it has been inserted.

Prior art, within United States Patent Application 20030021439 (Serial Number 124995, Series Code 10) and United States Patent Application 20050025336 (Serial Number 872962, Series Code 10), describes the insertion of a modulated carrier into selected locations of the data stream. These systems described the use of low-frequency carriers to embed information into sequences of frames. The inserted data was represented by the signs of the carriers whereby the carrier was added to a sequence to represent one symbol or subtracted from a sequence to represent a second symbol. The detector used in such systems must recover approximations to the carriers and then determine the likely sign with which it was embedded. In order to approximate the carrier, the detector must have a copy of the unmarked sequence from the original material. After careful spatial, temporal, and histogram registration of the two sequences, the detector interprets the difference as an approximation of the set of embedded carriers. The need for the unmarked sequence, and hence the original material, at the detector is a disadvantage of this approach.

Others have proposed solutions to this problem by way of embedding a sample of a watermark sequence in each frame of a sequence of frames. The embedding process modified the pixel values in the frame based upon the value of the watermark sample that corresponds to that frame. Each watermark sample was sometimes repeated in a predetermined number of sequential frames to increase the temporal space occupied by the watermark before the entire watermark was repeated. A scale factor was also used to reduce the amplitude of the inserted watermark sample in areas of the frame that were determined to lack motion from frame to frame and increased the amplitude of the inserted watermark sample in areas of the frame that had motion from frame to frame. This approach exploited the human visual system's higher sensitivity to flicker in flat fields over lower sensitivity in areas of motion.

The detector extracted the total luminance of each frame of a sequence and compared the changes in total luminance to the changes in the original watermark from frame to frame. This approach has a tendency to introduce an undesirable visible flickering artifact into the marked sequence. The ability to compare the changes in luminance to the changes in the original watermark is reduced when the luminance amplitude is lowered in flat field areas.

The present inventors recognize the advantage of reducing the occurrence of flicker in the watermarked output and removing the need for a copy of the unmarked input when detecting the watermark in a watermarked data stream.

SUMMARY

According to the present invention, the pixel values of luminance of a region are manipulated to establish a relationship among certain features of a sequence of frames. The present invention divides an image sequence into a number of regions. A region is further subdivided into a plurality of sub-regions such that the luminance in the sub-regions is approximately equal. Within each sub-region, locations, where a carrier can be added without introducing visible artifacts, are identified. The locations and allowed amplitudes of the carriers are supplied to an embedding apparatus. The embedder inserts carrier symbols in sub-regions by adding or subtracting the carrier at one or more locations. This adding and subtracting of carriers has the effect of increasing the luminance in sub-regions where carrier is added and decreasing the luminance in sub-regions where carrier is subtracted. This establishes a desired relationship between sub-regions (which started out having approximately equal luminance values). Detection is facilitated by providing information regarding the location of regions and sub-regions to the detection apparatus. For a particular region, the detector determines the luminance in the associated sub-regions. The relative luminance in sub-regions associated with a region determines the watermark data contained therein. Decoding successive regions recovers the embedded watermark information.

BRIEF DESCRIPTION OF THE DRAWINGS

FIG. 1 is a block diagram representing exemplary preprocessing steps according to the present invention.

FIG. 2 is a block diagram representing exemplary alternative preprocessing steps.

FIG. 3 is a block diagram representation of an exemplary embedding process.

FIG. 4 is a flow chart example of an exemplary embedding process.

FIG. 5 is a block diagram of an exemplary detection process.

FIG. 6 is an exemplary watermark detector apparatus.

DETAILED DESCRIPTION

According to the present invention, the pixel values of luminance of a region are manipulated to establish a relationship among certain features of a sequence of frames. The present invention divides an image sequence into a number of regions. A region is further subdivided into a plurality of sub-regions such that the luminance in the sub-regions is approximately equal. Within each sub-region, locations, where a carrier can be inserted without introducing visible artifacts, are identified. The embedder inserts carrier symbols in sub-regions by adding or subtracting the carrier at one or more locations. This adding and subtracting of carriers has the effect of increasing the luminance in sub-regions where carrier is added and decreasing the luminance in sub-regions where carrier is subtracted. This establishes a desired relationship between sub-regions (which started out having approximately equal luminance values).

In an exemplary embodiment, two sub-regions, region A and region B, having approximately equal luminance, are found. Locations where a carrier can be inserted without introducing artifacts are found within sub-regions. The locations and allowed amplitudes of the carriers are supplied to an embedding apparatus in groups; one (or more) for sub-region A labeled 'A' and one (or more) for sub-region B labeled 'B'. To embed one symbol (e.g., a "0" bit) the embedder adds the carriers labeled 'A' and subtract the carriers labeled 'B'. To embed the other symbol (e.g., a "1" bit) the embedder subtracts the carriers labeled 'A' and adds the carriers labeled 'B'. This adding and subtracting of carriers has the effect of increasing luminance in one sub-region and decreasing luminance in the other sub-region, thus establishing the desired relationship between the two sub-regions (which started out having approximately equal luminance values).

In fact, the goal of the embedder is to establish the desired relationship between the two sub-regions and the use of carriers as described in the exemplary embodiment above is but one way to do this. In a second embodiment, the luminance values of all of the pixels in a region are either increased or decreased in order to establish the desired relationship. The amount by which a pixel luminance changes can be a constant factor or can be dependent on a model that analyzes the underlying imagery and can be dependent on the distance from the pixel to the region boundary.

Detection is facilitated by providing information regarding the location of regions and sub-regions to the detection apparatus. For a particular region, the detector determines the luminance in the associated sub-regions. The relative luminance in sub-regions associated with a region determines the watermark data contained therein. If luminance in sub-region A is larger than that of sub-region B, the detector reports one symbol (e.g., a "0" bit) and if luminance in sub-region B is larger than that in sub-region A, the detector reports the other symbol (e.g., a "1" bit). Decoding successive regions recovers the embedded watermark information.

The watermarking process, according to the present invention, begins with a preprocessing stage (100) as exemplified in FIGS. 1 and 2. The original sequence is segmented into disjoint sets of contiguous frames, called temporal segments, by temporal segmentation element (101). Each temporal segment can have either the same as or a different number of frames than the other temporal segments have. Additional security can be introduced by allowing different segments to have a different number of frames. The number of frames per individual temporal segment can be controlled using a random number generator seeded by a secret key (107). Different temporal segments consist of different numbers of frames as controlled by the random number generator. The number of frames per segment appears to be random. Secret key (107) is used in the preprocessing element (100) shown in FIG. 1 and FIG. 2 as an input to the temporal segmentation block (101).

The secret key is also used in the detection process (300), shown in FIG. 5, to locate the frames used in each individual segment.

The random number of frames to be used can be forced to follow a specified distribution. For additional security, two adjacent segments may have a random number of skipped frames between them. In a practical exemplary embodiment, the number of frames in a segment is a random number drawn from a Gaussian distribution with mean 120 and standard deviation 20 and the number of skipped frames between adjacent segments is a random number drawn from a Gaussian distribution with mean 12 and standard deviation 2. At the start of preprocessing, the random number generator used for these values is initialized with a secret key. The detector has the same random number generator and, given the same secret key, can regenerate exactly the number of frames in each segment and the number of skipped frames between segments.

A segment or region is a sequence of images and can be interpreted as a three dimensional volume of data. A region is subdivided, according to the present invention, into two sub-regions. The goal of this processing is to find two volumes within the segment volume such that the total luminance in the first volume is equal to the total luminance in the second volume. In one embodiment, this is accomplished by finding a geometric plane through the segment volume such that the total luminance on one side of the plane is equal to the total luminance on the other side of the plane. This is accomplished by first sub-sampling the segment volume to a lower resolution and then performing a search to find a plane that minimizes the difference between the luminance on one side of the plane and the luminance on the other side of the plane. This plane is then used in the full resolution segment.

In a second embodiment, a few test planes are examined in the low resolution segment volume and then a gradient descent algorithm is applied to find a plane that minimizes the difference between the total luminance on one side and the total luminance on the other. This plane is then used in the full resolution segment.

In a third embodiment, one of the first two methods is used to find a starting plane in the full resolution segment. From this starting plane, a search using an algorithm that scans an entire volume to look for possible matches or a gradient descent search is applied within a search window around the starting plane.

In a fourth embodiment, a first volume that coincides with the first frame of a segment and a second volume that coincides with the last frame of a segment are used as starting points. Luminance of the first and second volumes is determined. If luminance of the first volume is greater than luminance of the second volume, the second volume is increased by moving the second volume boundary toward the first volume by including the frame adjacent to the current second volume to form a new second volume. Luminance of the new second volume, bounded by the new location containing two frames at the end of the segment is now determined. If luminance of the second volume is greater than luminance of the first volume, then the first volume is increased by moving the first volume boundary toward the second volume boundary by including the frame adjacent to the current first volume to form a new first volume. Luminance of the new first volume is now determined. Again luminance of the first and second volumes is compared. The plane bounding the volume with the lower luminance is then moved toward the plane bounding the volume with the higher luminance one frame at a time. This process continues until the boundary of the two volumes resides in the same frame. At this point luminance in sub-region one (volume one) is nearly equal to luminance in sub-region two (volume two). The angles of the plane with respect to the three dimensional axes are now adjusted to optimize luminance in both sub-regions to be practically equal. The discovered plane can be described using values in a co-ordinate system adapted to the segment volume. For each segment, these values are saved for use in detection.

As one of ordinary skill in the art would understand, alternate descriptions of the sub-region volumes may be used to identify the volumes to the embedder and detector.

A carrier can be a three dimensional shape that slowly changes in each of the dimensions. One example of a carrier shape is a shape that is a Gaussian shape in each dimension. This carrier shape has a center at which its magnitude is greatest. Looking at the frame in which the center is located, the magnitude of the carrier falls off gently in proportion to the distance from the center. Similarly, along the time axis, for any one pixel location, the magnitude of the carrier decays gradually in proportion to the distance from the center frame.

Adding a carrier to a sub-region will have the effect of increasing luminance of that sub-region and subtracting a carrier from a sub-region will have the effect of decreasing luminance of that sub-region. Each sub-region can be interpreted as a three dimensional volume of data and each pixel within that sub-region is a potential center location for a carrier. Within each sub-region, a pixel is selected to serve as the center location for a carrier.

In one practical embodiment, a pixel selected as a center location is chosen at random. This selection need not be recreated at the detector, so the initialization for this random selection need not be saved. In a second practical embodiment, a perceptual model is used to assess the visual impact of a carrier at each pixel location within the sub-region. The location that will result in the minimal visual impact, or any location that results in a visual impact below some threshold, can be chosen as the center location for a carrier. In a third practical embodiment, a perceptual model is used to predict the maximum amplitude at which a carrier can be added to pixels without introducing a visual impact. The output of this process is an amplitude value for pixels in the sub-region. The location that can support the maximum amplitude can then be chosen.

In the first two embodiments, a location for the carrier center is returned. This can be represented by three values, x, y, and frame number; where frame number is an offset into the segment. The amplitude of the carrier is implied. In a third embodiment, an amplitude of a carrier is also specified. This information, a location and possibly an amplitude of a carrier, is saved for use during embedding.

In an alternative embodiment, sub-region volumes and carrier locations are determined simultaneously. The goal is to find sub-region volumes within a segment and a plurality of carriers, one in each volume, such that when carriers are added and others are subtracted, sub-regions will have, a detectable difference in luminance indicating to which regions carriers were added and from which carriers were subtracted.

FIG. 3 shows inputs and outputs of an exemplary embedding process. The payload is first source coded. This step often includes an error correction coding and may include anti-collusion coding. This coded payload is an input to an embedder. Two main inputs to an embedder are embedding data that was created during preprocessing and an input sequence. Exemplary embedding data consists of a table with one entry for each carrier. Each entry contains a segment number, a center location of a carrier, and optionally an amplitude of a carrier. A center location can be specified with an X and Y spatial position, while an F temporal position can indicate the frame number (perhaps relative to the start of a segment). Carriers can appear in pairs, both associated with the same segment number. Embedding table data is typically ordered by time. Pairs of carriers associated with temporal segments can appear in the same order as the temporal segments appear in an input image sequence. This allows the embedder to process carrier pairs in the order they appear in an embedding data table as it processes an image sequence in order.

FIG. 3 also shows a fourth input, a carrier table. This is an optional table that can be read by or generated by an embedder upon initialization. It is a three dimensional table containing values of a canonical carrier function. This allows a fast look-up of carrier values during embedding rather than requiring calculation of values for each pixel. An exemplary embedding process can assign one coded payload bit to each pair of carriers. The payload bit can be one of two symbols. One of those symbols is interpreted to mean that a first carrier is added to an image sequence and a second carrier is subtracted. Another symbol means that a first carrier is subtracted from an image sequence and a second carrier is added.

A practical embodiment of this process is shown in FIG. 4. For a pair of carriers in an embedding data table (105), an embedder (200) determines a range of frames in which carriers can contribute. Similarly, an embedder determines a range of rows and columns to which each carrier can contribute. This changes depending on which frames are being examined. In one practical embodiment, a range of a carrier can be approximated by a rectangle in the center frame of that carrier. This rectangle contains all of the non-zero values of that carrier. For each carrier, an embedder can thus determine a range of pixels, as specified by a three dimensional rectangular box, that may be affected by the addition (or subtraction) of that carrier. Since carrier pairs are disjoint in time and appear in an embedding data table in temporal order, an embedder can consider carrier pairs one at a time. For a current carrier pair, the first frame number that will be affected can be found. All frames of an input sequence between the current frame and this first affected frame can be passed to the output without modification. Input sequence frames that will be affected are modified in the affected locations by either adding a corresponding carrier value from a carrier table, scaled by an amplitude specified in an embedding data table or by subtracting a corresponding carrier value from, a carrier table, scaled by an amplitude specified in an embedding data table. The choice of whether to add or subtract is dictated by a current payload symbol.

The Detection Processor, shown in FIG. 5, receives a marked and potentially distorted image sequence (310). Prior to running the detection process, detection data (106) must be available. This detection data can contain the secret key used to temporally segment the sequence and descriptions, for each segment, of sub-regions to be found in a segment. The detector (300) performs a subdivision of the segment into sub-regions and finds and compares luminance of sub-regions. Luminance differences from sub-region to sub-region that resulted from Comparison Block (302) are applied to payload decoding block (303). The output of Payload Decoding Block (303) is detected watermark payload (320). A source decoder within Payload Decoder (303) is an inverse to the source encoder used during embedding.

Exemplary Watermark Detector apparatus, shown in FIG. 6, has a watermarked input sequence (310) as input. A Segment Locator (601) uses Detection Data (106) which may include Secret Key (107) to identify segments within the watermarked image sequence (310). Sub-Region Locator (602) identifies sub-regions located within a segment. The luminance values of sub-regions are found using Luminance Detector (603) and are stored for use by Comparator (604). Comparator (604) determines the respective luminance values to decode the watermark information.

It is to be understood that the present invention may be implemented in various forms of hardware, software, firmware, special purpose processors, or a combination thereof. In one exemplary embodiment, the present invention can be implemented as a combination of hardware and software. Software for example may be implemented as an application program tangibly embodied on a program storage device. The application program may be uploaded to, and executed in one exemplary embodiment by a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. For example, watermark detector elements 601 through 605 shown in FIG. 6 may be implemented as subroutines on a computer platform or by a processor including a computer processor. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for processing data for insertion of watermark data, the method comprising the steps of:
   (a) dividing an image sequence into a plurality of regions;
   (b) subdividing one of said regions into a plurality of sub-regions such that luminance in a selected sub-region is approximately equal to luminance in another sub-region, wherein the one of said regions is subdivided by selecting a plane within a volume where luminance on one side of the plane is approximately equal to luminance on a second side of the plane; and
   (c) selecting a location within said selected sub-region that is suitable for inserting a luminance amplitude different from the original luminance amplitude at that location; wherein a plane is found using a method comprising the steps of:
   (i) finding luminance of a first volume containing the first frame of a region and finding luminance of a second volume containing the last frame of a region;
   (ii) comparing luminance of said first volume to luminance of said second volume and finding a higher luminance volume and a lower luminance volume;
   (iii) increasing said lower luminance volume by including the next frame adjacent to said lower luminance volume and finding luminance of this new volume;
   (iv) comparing luminance of the new volume to luminance of said higher luminance volume to find a new higher luminance volume and a new lower luminance volume;
   (v) repeating steps (iii) and (iv) using the new higher luminance and new lower luminance volumes until all frames in the region have been included in either the higher luminance volume or the lower luminance volume whereby a plane separating the two volumes is located in a single frame;
   (vi) adjusting the angle of the plane separating the two volumes, relative to one or more of the axes, to optimize luminance in both sub-regions to be practically equal.

2. The method according to claim 1, wherein a luminance amplitude representative of watermark data is inserted at a selected location.

3. The method according to claim 1, wherein a plurality of locations suitable for inserting luminance amplitudes are selected and one or more of a plurality of luminance amplitudes representative of watermark data are inserted.

4. The method according to claim 1, wherein luminance is subsampled to a lower resolution before selecting a plane.

5. The method according to claim 4, wherein a plane is selected by performing a search to minimize the differences between luminance values on opposite sides of the plane.

6. The method according to claim 4, wherein a plurality of test planes are located and a gradient descent algorithm is used to select a plane.

7. The method according to claim 4 or claim 5 or claim 6, wherein the selected plane is used in full resolution regions or sub-regions.

* * * * *